UNITED STATES PATENT OFFICE.

CLAUDE A. P. TURNER, OF MINNEAPOLIS, MINNESOTA.

METHOD OF MAKING ARTIFICIAL STONE.

1,069,832.  Specification of Letters Patent. Patented Aug. 12, 1913.

No Drawing.  Application filed September 4, 1907.  Serial No. 391,290.

*To all whom it may concern:*

Be it known that I, CLAUDE A. P. TURNER, of Minneapolis, in the county of Hennepin, and in the State of Minnesota, have invented a certain new and useful Improvement in Methods of Making Artificial Stone, and do hereby declare that the following is a full, clear, and exact description thereof.

My invention relates to the manufacture of artificial stone by the use of sand molds. Heretofore such molds have been treated with various chemicals, such as alum and sulfuric acid to render the sand easier to work. But, while affording this benefit the acid appears to hasten the setting of the cement on the surface of the block, which by reason of the surface tension due to the rapid setting produces lines which catch dirt and appear like hair cracks in the finished product after it has weathered.

The object of my invention generally stated is to overcome this specific difficulty, and while rendering the sand easier to work, prevent too rapid setting of the cement next to the surface of the mold.

Another object of my invention is to render the stone water proof and otherwise improve its quality.

In the practice of my invention, I treat the molding sand (which is silicious sand) with a saturated solution of salt, using sodium chlorid, or any other salt of the group. The presence of the salt in the sand retards the setting of the cement next the surface of the mold, and thereby prevents the formation of lines on the block surface. It also enables the sand to be worked with a higher per cent. of moisture and renders it more cohesive, thereby lessening the care and labor of molding. Preferably I add to the sand a small proportion of marl, say about 20 per cent. The marl retards absorption and adds to the cohesiveness of the mold mixture. I also spray the surface of the sand mold with a soap solution, and mix an alum solution with the liquid stone composition or cement concrete. When the latter is put into the mold, the excess water in the concrete is first absorbed by the mold and then taken back into the cement as required to complete crystallization, so that the combined solutions of alum and soap are carried into the matrix. This renders the stone waterproof and otherwise improves it.

I am aware that soap and alum have been used for waterproofing stone, but I am not aware that they have ever been applied as I do, to wit, their separate application to the mold and the cement so that they are kept apart until the cement is poured into the mold.

Having thus described my invention, what I claim is:—

The method of making artificial stone which consists in forming a mold of sand treated with a salt solution, applying a soap solution to the surface of the sand mold, and then placing the artificial stone composition in said mold.

In testimony that I claim the foregoing I have hereunto set my hand.

CLAUDE A. P. TURNER.

Witnesses:
 L. S. HILLEBRAND,
 H. R. RUPP.

Copies of this patent may be obtained for five cents each, by addressing the "Commissioner of Patents, Washington, D. C."